United States Patent
Schneider et al.

(10) Patent No.: US 10,680,799 B2
(45) Date of Patent: Jun. 9, 2020

(54) SECURE REMOTE AGGREGATION

(71) Applicant: ABB Schweiz AG, Baden (CH)

(72) Inventors: Johannes Schneider, Fislisbach (CH); Matus Harvan, Zürich (CH); Sebastian Obermeier, Schinznach-Dorf (CH); Thomas Locher, Zürich (CH); Yvonne-Anne Pignolet, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/189,126

(22) Filed: Nov. 13, 2018

(65) Prior Publication Data

US 2019/0097787 A1   Mar. 28, 2019

Related U.S. Application Data

(63) Continuation of application No. PCT/EP2017/060918, filed on May 8, 2017.

(30) Foreign Application Priority Data

May 13, 2016  (EP) ..................................... 16169600

(51) Int. Cl.
*H04L 9/00*   (2006.01)

(52) U.S. Cl.
CPC .......... *H04L 9/008* (2013.01); *H04L 2209/46* (2013.01); *H04L 2209/76* (2013.01)

(58) Field of Classification Search
CPC ..................................................... H04L 9/008
See application file for complete search history.

(56) References Cited

U.S. PATENT DOCUMENTS

| | | | | |
|---|---|---|---|---|
| 6,885,748 B1 * | 4/2005 | Wang | ....................... | G06F 21/10 380/201 |
| 2014/0177828 A1 * | 6/2014 | Loftus | ..................... | H04L 9/008 380/44 |

(Continued)

FOREIGN PATENT DOCUMENTS

| | | |
|---|---|---|
| EP | 2485430 A2 | 8/2012 |
| EP | 2485430 A3 | 8/2013 |

OTHER PUBLICATIONS

European Patent Office, International Preliminary Report on Patentability issued in corresponding Application No. PCT/EP2017/060918, dated Jun. 27, 2018, 15 pp.

(Continued)

*Primary Examiner* — Ponnoreay Pich
(74) *Attorney, Agent, or Firm* — Taft Stettinius & Hollister LLP; J. Bruce Schelkopf

(57) ABSTRACT

The application relates to a method for aggregation of a performance indicator of a device including: concatenating a respective first data item to a plurality of second data items in the device; encrypting the plurality of concatenated second data items relevant for computing the performance indicator using a first encryption key in the device, wherein the first encryption key is based on an additive homomorphic encryption scheme; sending the encrypted concatenated second data items to a computation cluster; computing the performance indicator on the computation cluster using the encrypted concatenated second data items and computing an aggregate value regarding the performance indicator by summing up the encrypted concatenated second data items; sending the aggregate value to a server of a service provider of the device; decrypting the aggregate value using a second encryption key on the server of the service provider; and verifying the decrypted result by checking whether the decrypted sum computed by summing up the encrypted concatenated second data items comprises a predetermined value. The present application also relates to a corresponding system and corresponding computer program product including one or more computer readable media having computer executable instructions for performing the steps of the method.

20 Claims, 1 Drawing Sheet

(56) References Cited

U.S. PATENT DOCUMENTS

2015/0288665 A1\* 10/2015 El Emam ............... G06F 16/86
                                                713/171
2018/0131512 A1\*  5/2018 Gajek ..................... H04L 9/008
2019/0097787 A1\*  3/2019 Schneider .............. H04L 9/008

OTHER PUBLICATIONS

European Patent Office, Written Opinion of the International Preliminary Examining Authority issued in corresponding Application No. PCT/EP2017/060918, dated Apr. 20, 2018, 17 pp.
European Patent Office, International Search Report & Written Opinion issued in corresponding Application No. PCT/EP2017/060918, dated Jul. 18, 2017, 11 pp.
European Patent Office, Extended Search Report issued in corresponding Application No. 16169600.0, dated Nov. 18, 2016, 7 pp.
ABB Schweiz AG, PCT Direct Letter submitted to European Patent Office on May 8, 2017, in corresponding Application No. PCT/EP2017/060918, 23 pp.
Lu et al., "EPPA: An Efficient and Privacy-Preserving Aggregation Scheme for Secure Smart Grid Communications," IEEE Transactions on Parallel and Distributed Systems, vol. 23, No. 9, Sep. 2012, pp. 1621-1632.
Rafik et al., "SA-SPKC: Secure and efficient Aggregation scheme for wireless sensor networks using Stateful Public Key Cryptology," 2013 11th International Symposium on Programming and Systems, IEEE, Apr. 22, 2013, pp. 96-102.
Ge et al., "Answering Aggregation Queries in a Secure System Model," 33rd International Conference on Very Large Data Bases, Sep. 23, 2007, pp. 519-530.

\* cited by examiner

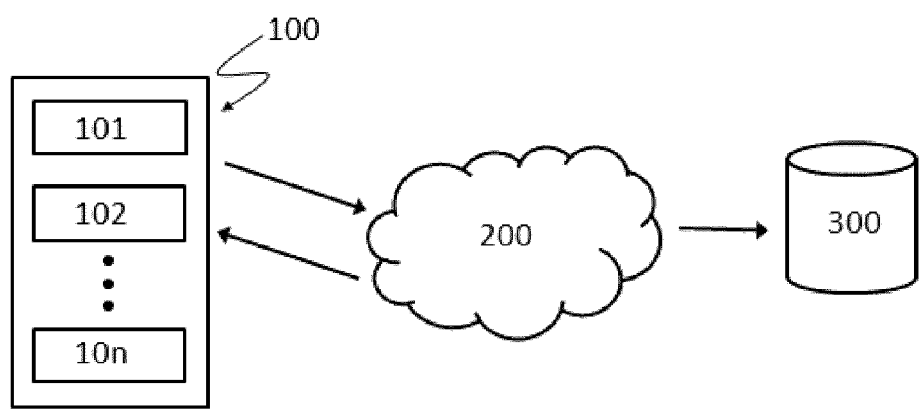

SECURE REMOTE AGGREGATION

FIELD OF THE INVENTION

The invention relates to a method and a system for aggregation of a performance indicator of a device. The invention particularly relates to a method and a system for aggregation of a performance indicator for fleets of devices.

BACKGROUND OF THE INVENTION

The trend towards remote storage and analysis of data leads to the development of platforms providing a central infrastructure that manages the remote connection to customers, offers storage for collected data, and can perform analytics on the collected data. One crucial aspect of such platforms is confidentiality and integrity, i.e., the platform should not learn anything about the data it stores and processes, while executing aggregation and other functions on the data.

The difficulty of achieving this goal increases when there are several users, which neither trust each other nor the storage and processing platform, yet functions across all users must be carried out. A specific case of this problem is fleet management. A fleet is a set of serviced products/systems of the same type that are managed together, e.g., by a single asset owner. In particular this concerns the scenario where several customers provide encrypted data to a particular platform, which in turn computes key performance indicators, KPIs, across this data without learning more than the computed aggregate values. In this context KPIs, hereinafter also referred to as performance indicator, refer to any aggregate function over any set of the device's output data or over any set of performance data relating to the device itself.

In particular, product line managers at a company with a multi-vendor strategy who are responsible for a fleet of products would like to aggregate/compose/combine the results of individual asset health checks of the equipment by the equipment type. This allows the product line managers to know at any point in time how the fleet is performing and which members of the fleet require attention. This information helps to rapidly respond to inquiries from management, schedule maintenance actions, and also to compare their fleet with those of competitors.

This use case is different from classic remote data processing since every customer ideally encrypts their data with their own private key, yet the service provider should be able to derive actionable insights from this information. In contrast to traditional multi-party computation, the customers should be involved as little as possible. In the ideal case, they provide input only and are not needed for further interactions.

Privacy is considered to be a key requirement by customers. In the chemical industry, for example, chemical reactions are well known, but the customers consider the intellectual property to be the production process. For such applications, even the lead provider is not allowed to view individual parameters, which makes fleet management of the data very difficult.

There is a lot of related work on privacy-preserving outsourcing of computation. However, the mechanisms found in the literature have either different scenarios, weaker security assumptions or higher complexity, e.g., in terms of the required communication between all parties.

[1] relates to efficient outsourcing multi-party computation being based on the assumption that all parties are "semi-honest", i.e., they faithfully execute the given protocols and only collect information that is accessible to them. However, it is not assumed that an attacker can also actively try to gather information, e.g., by misusing the protocols.

A scheme based on "multi-key fully homomorphic encryption" has also been proposed in [2] that does not require many communication rounds; however, the decryption phase is interactive and the computational overhead is large [2].

The journal contribution of Rafik et al., "SA-SPKC: Secure and efficient aggregation scheme for wireless sensor networks using stateful public key cryptography", IEEE Programming and Systems (ISPS), 2013 11th International Symposium, p. 96-102, relates to data aggregation in wireless sensor networks and a respective security protocol which addresses the security services for the wireless sensor networks wherein only the base station can verify the individual data and identify the malicious node.

The journal contribution of Lu et al., "EPPA: An Efficient and Privacy-Preserving Aggregation Scheme for Secure Smart Grid Communications", IEEE TRANSACTIONS ON PARALLEL AND DISTRIBUTED SYSTEMS, 2012, p. 1621-1631, relates to an aggregation scheme for secure smart grid communications.

DESCRIPTION OF THE INVENTION

The present invention addresses the problem of handling the data of a fleet of devices in a secure manner. To this end, data is stored and processed in an untrusted third-party platform, i.e. a cloud, is necessary. The platform must not learn about individual data items; however, it must be able to compute aggregates over the data, which it can make available to the service provider. The service provider can use these aggregates to determine usage and performance metrics for its devices without learning any fine-grained information about the data from each device.

Concerns about privacy are a significant roadblock to the adoption of fleet management. Thus, it is an objective of the present invention to facilitate the adoption of fleet management systems by providing strong protection of user data.

It is an objective of the present invention to offer security for the user of devices which are connected to a computation cluster, i.e. a cloud, that goes beyond the security guarantees of cloud providers which typically only protect the communication between the customers and the cloud and the data at rest in the cloud. However, the cloud provider typically has the decryption keys to examine all data and could illicitly use them.

These and other objectives are achieved by a method, a system and a computer program product according to the independent claims. Preferred embodiments are evident from the dependent patent claims.

In particular, the invention offers the following security features:
1. The service provider does not learn more than the aggregates even if it colludes with the computation cluster.
2. If the computation cluster and the service provider do not collude, then the computation cluster does not learn anything about the aggregates or individual data items.
3. The service provider can verify that the computation cluster carried out the functions correctly.

The present invention paves the way for new services because customers can verify the involved cryptographic algorithms and therefore be sure that the provider of the fleet of devices cannot trace individual values, but is still able to analyze the data for the customer.

The present invention relates to a method for aggregation of a performance indicator of a device comprising the steps of:

a) concatenating a respective first data item to a plurality of second data items in the device;

b) encrypting the plurality of concatenated second data items relevant for computing the performance indicator using a first encryption key in the device, wherein the first encryption key is based on an additive homomorphic encryption scheme;

c) sending the encrypted concatenated second data items to a computation cluster;

d) computing the performance indicator on the computation cluster using the encrypted concatenated second data items and computing an aggregate value regarding the performance indicator by summing up the encrypted concatenated second data items;

e) sending the aggregate value to a server of a service provider of the device;

f) decrypting the aggregate value using a second encryption key on the server of the service provider; and g) verifying the decrypted result by checking whether the decrypted sum computed by summing up the encrypted concatenated second data items comprises a predetermined value.

Preferably, the first data item comprises or is at least one number of at least one set of numbers $N \in \{1 \ldots m\}$. In other words, preferably, step a) comprises concatenating a respective set of numbers $N \in \{1 \ldots m\}$ to the plurality of second data items in the device. Preferably, the predefined value is $m(m+1)/2$. Preferably, each number $1, \ldots, m$ occurs exactly once. This ensures that the sum is $m(m+1)/2$. Preferably, multiple numbers are added so that the sum for each added number becomes $m(m-1)/2$.

Preferably, the first data item includes, is part, is at least one value of or comprises at least one value of a protection function for the integrity of the computation. In other words, preferably, the (respective) first data item is configured to allow to ensure the protection of the integrity of the computation.

Preferably, the second encryption key is only configured to decrypt the aggregate value.

Preferably, the second encryption key is also based on the homomorphic encryption scheme.

Preferably, the method further comprises the step of encrypting a plurality of concatenated second data items relevant for computing the performance indicator using a third encryption key in a second device and wherein the performance indicator on the computation cluster is computed using the encrypted concatenated second data items of the device and the second device and the aggregate value regarding the performance indicator is computed on the basis of the encrypted concatenated second data items of the device and the second device.

Preferably, the aggregate value is computed by further performing at least one of the following functions: computing the average of the encrypted concatenated second data items, computing the variance of the encrypted concatenated second data items, and computing the weighted sums of the encrypted concatenated second data items.

Preferably, the method further comprises the step before step a) of concatenating the plaintext to be encrypted with verification numbers, wherein the verification numbers are preferably randomly chosen from a predefined set of numbers.

Preferably, the verification of the decrypted result after step e) is based on checking whether the verification number part of the decrypted plaintext is equal a certain value. Preferably, the certain value depends on the function used for computing the performance indicator.

Preferably, the method further comprises the following steps between step c) and d):

sending the aggregate value to a user of the electronic device, the electronic device or a second provider;

decrypting the aggregate value regarding the performance indicator; and encrypting the aggregate value regarding the performance indicator with a key being different from the first encryption key, and wherein step d) comprises the step of sending the re-encrypted aggregate value regarding the performance indicator to the service provider of the device.

Preferably, the second encryption key is based on a stateful encryption scheme. With stateful encryption it is possible to give the service provider a key that only allows the decryption of sums, but not of the individual values. Preferably, the encryption of the m first data items—in case the first data item is or comprises at least one number of at least one set of numbers $N \in \{1 \ldots m\}$—is performed by adding a random value $k_j$ to the jth data item, where $\Sigma_i k_j = K$. If the service provider knows K, K can be subtracted from the obtained result to get the sum of the data items.

Preferably, the performance indicator is the averaged temperature of the at least one device. Preferably, the performance indicator is at least one of the following: pressure, humidity, torque, force, noise level, voltage, amperage or accumulated events such as number of anomalous events, number of faults or the like.

The invention also refers to a system for aggregation of a performance indicator of a device comprising: the device, wherein the device is configured to concatenate a respective first data item to a plurality of second data items and is configured to encrypt a plurality of concatenated second data items relevant for the computation of the performance indicator of the device using a first encryption key, wherein the first encryption key is based on an additive homomorphic encryption scheme, a sending unit configured to send the encrypted concatenated second data items to a computation cluster; the computation cluster being configured to compute the performance indicator of the device using the encrypted concatenated second data items and being configured to compute an aggregate value regarding the performance indicator by summing up the encrypted concatenated second data items; and a sending unit configured to send the aggregate value to a server of the service provider of the device, wherein the system further comprises the server of the service provider being configured to decrypt the aggregate value using a second encryption key and wherein the system further comprises a verification unit being configured to verify the decrypted result by checking whether the decrypted sum computed by summing up the encrypted concatenated second data items comprises a predetermined value.

Preferably, the system further comprises a second device being configured to encrypt a plurality of concatenated second data items relevant for computing the performance indicator using a third encryption key. Preferably, the computation cluster is configured to compute the performance indicator using the encrypted concatenated second data items of the device and the second device and is configured to compute the aggregate value regarding the performance indicator on the basis of the encrypted concatenated second data items of the device and the second device.

Preferably, the computation cluster is configured to compute the aggregate value by further performing at least one of the following functions: computing the average of the encrypted concatenated second data items, computing the variance of the encrypted concatenated second data items, and computing the weighted sums of the encrypted concatenated second data items. In this context, the average of the encrypted concatenated second data items preferably refers to a pair, i.e. the sum and a count. In addition, the variance also preferably refers to a pair, i.e. the sum of squared values and the sum of values squared.

Preferably, the sending unit is configured to send the aggregate value to a user of the electronic device, the electronic device or a second provider.

Preferably, the user of the electronic device, the electronic device or the second provider is configured to decrypt the aggregate value and is configured to encrypt the aggregate value with an encryption key being different from the first encryption key.

Preferably, the sending unit is configured to send the re-encrypted aggregate value to the server of the service provider of the device.

Preferably, the second encryption key is based on a stateful encryption scheme.

Preferably, the server of the service provider is configured to decrypt the aggregate value using the second encryption key.

BRIEF DESCRIPTION OF THE DRAWINGS

The subject matter of the invention will be explained in more detail in the following text with reference to preferred exemplary embodiments which are illustrated in the attached drawings, in which:

FIG. 1 schematically shows a system for aggregation of a performance indicator of a device according to an embodiment of the present invention.

The reference symbols used in the drawings, and their primary meanings, are listed in summary form in the list of designations. In principle, identical parts are provided with the same reference symbols in the FIGURES.

DETAILED DESCRIPTION OF PREFERRED EMBODIMENTS

FIG. 1 schematically shows a system for aggregation of a performance indicator of a device 101-10n.

The system comprises a fleet of devices 100 and a computation cluster 200. The fleet of devices 100 comprises a plurality of devices 101 to 10n. However, it is understood for the skilled person that the present invention also refers to cases where only one device is present. The fleet of devices 100 may be of the same or different devices. At least one device, e.g. the device 101, of the plurality of devices 101 to 10n a) concatenates a respective first data item to a plurality of second data items. In this embodiment, the first data item includes at least one set of numbers $N \in \{1 \ldots m\}$. Then, the device 101 encrypts the plurality of concatenated second data items relevant for computing a performance indicator, e.g. the average temperature, using a first encryption key. The first encryption key is based on an additive homomorphic encryption scheme. The device 101 sends the encrypted concatenated second data items to the computation cluster 200, hereinafter referred to as the cloud 200.

The cloud 200 computes the performance indicator, i.e. the average temperature in this embodiment, and also computes an aggregate value regarding the average temperature.

Then, the cloud 200 sends the aggregate value to a provider 300 of the fleet of devices 100.

The provider 300 of the fleet of devices 100 decrypts the aggregate value using a second encryption key wherein the second encryption key is only capable of decrypting the aggregate value but not the performance indicator itself. In other words, the second encryption key can only decrypt aggregate values but not individual values.

The present invention provides aggregation of one or more performance indicators over A) a large number of data items for an individual device, so-called temporal aggregation, and/or B) a large number of devices, so-called spatial aggregation. However, it is understood by the skilled person that any combination of temporal and spatial aggregation is possible.

In the following, the temporal aggregation and the spatial aggregation are explained:

A) Temporal aggregation

For temporal aggregation, i.e. aggregation of data from one device over a predefined time window, exemplarily embodiments are hereinafter described where additive homomorphic encryption is used for encryption. All concatenated second data items that are sent to the cloud 200 and that the cloud 100 processes for temporal aggregations are encrypted under the same key. For re-encryption there are three options.

a) The computation cluster 200 sends the encrypted result of the aggregation, i.e. the aggregate value, which is optionally blinded, to the device 101, which then decrypts the aggregate value, verifies and re-encrypts the aggregate value with the public key of the service provider 300. Afterwards, the re-encrypted aggregate value is sent by the device 101 to the service provider 300.

b) With stateful encryption it is possible to give the service provider 300 a key that only allows the decryption of sums, but not of the individual values. As an example, in case the first data item is or comprises at least one set of numbers $N \in \{1 \ldots m\}$, the encryption of the m data items by adding a random value $k_j$ to the jth data item is considered, with $\Sigma_j k_j = K$. If the service provider 300 knows K, it can subtract K from the obtained result to get the sum of the data items.

c) A party, which does not collude with the computation cluster, e.g. a second provider is given a proxy-re-encryption key for the service provider. The computation cluster 200 sends a blinded result/aggregate value to this party. If the verification process succeeds, it carries out the re-encryption of the aggregate value with the service provider's key and sends the aggregate value back to the computation cluster 200. The computation cluster 200 then removes the blind and forwards the result to the service provider 300.

B) Spatial Aggregation

For spatial aggregation, i.e. aggregation of data at time t over a set of devices, it has to be considered that data items may be encrypted under different keys for each device 101 to 10n.

In order to enable the computation cluster 200 to calculate the aggregate value, e.g. the sum of the performance indicator, according to this embodiment, either (i) there exists an operation to ensure that ciphertexts are encrypted under the same key or (ii) the encryption scheme must offer an operation on the keys to derive the key under which the ciphertext of the sum is encrypted.

An embodiment of the present invention dealing with (i) uses the fact that the BCP scheme [3] has the following property: Let $k=k_1+k_2$. For a data item d it holds that an encryption of d under the key k can be decrypted by running the decryption operations once with $k_1$ and then once by $k_2$, i.e., $d=D(k_2, D(k_1, E(k, m)))$. In this case, a non-colluding third party, e.g. a $2^{nd}$ service provider, can be given a key k which is unknown to the computation cluster 200. Each device 101 to 10n being involved in the process generates a random number k, and sends it to the computation cluster 200. The private keys $pk_j$ of the devices 101 to 10n can then be computed by adding $k_j$ to k. In other words, $pk=k\_i+k$, i.e. k_i is computed based on the device's 100 private key and the cloud's 200 key k. All devices 101 to 10n encrypt their data items with their keys $pk_j$ and send them to the computation cluster 200, which in turn runs one decryption operation with $k_{j1}$. This ensures that all values are encrypted under the third parties key k. For the remaining steps the procedures for temporal aggregation can be used.

In an embodiment using (ii) each device 101 to 10n blinds its data item(s) with a random value $x_j$ which is encrypted under the public key of a non-colluding third party. In other words, a pair is sent, the blinded data item, and also the encrypted blind. The computation cluster 200 can sum up both the blinded data items and the encrypted random values and send a blinded version of these sums to the third party. The third party can thus decrypt the sum of the random values, subtract it from the sum of the blinded data items if the verification of the random values is successful and then re-encrypt the result for the service provider 300. The computation cluster 200 removes the blind from the result, i.e. the aggregate value, and forwards it to the service provider 300.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

100—Fleet of devices
101—10n Device
200—Computation Cluster
300—Service Provider

REFERENCES

[1]—Peter, Adrian, Erik Tews, and Stefan Katzenbeisser. "Efficiently Outsourcing Multiparty Computation under Multiple Keys." Information Forensics and Security, IEEE Transactions on 8, no. 12 (2013): 2046-2058.
[2]—López-Alt, Adriana, Eran Tromer, and Vinod Vaikuntanathan. "On-the-fly Multiparty Computation on the Cloud via Multikey Fully Homomorphic Encryption." Proceedings of the forty-fourth Annual ACM Symposium on Theory of Computing STOC), 2012.
[3]—Bresson, Emmanuel, Dario Catalano, and David Pointcheval. "A Simple Public-Key Cryptosystem with a Double Trapdoor Decryption Mechanism and its Applications." In Advances in Cryptology-ASIACRYPT 2003, pp. 37-54.

The invention claimed is:

1. A method for aggregation of a performance indicator of a device comprising the steps of:
    a) concatenating a respective first data item to a plurality of second data items in the device;
    b) encrypting the plurality of concatenated second data items relevant for computing the performance indicator using a first encryption key in the device, wherein the first encryption key is based on an additive homomorphic encryption scheme;
    c) sending the encrypted concatenated second data items to a computation cluster;
    d) computing the performance indicator on the computation cluster using the encrypted concatenated second data items and computing an aggregate value regarding the performance indicator by summing up the encrypted concatenated second data items;
    e) sending the aggregate value to a server of a service provider of the device;
    f) decrypting the aggregate value using a second encryption key on the server of the service provider; and
    g) verifying the decrypted result by checking whether the decrypted sum computed by summing up the encrypted concatenated second data items comprises a predetermined value.

2. The method according to claim 1, wherein the first data item is or comprises at least one number of at least one set of numbers $N \in \{1 \ldots m\}$ and the predefined value is $m(m+1)/2$.

3. The method according to claim 2, wherein the second encryption key is only configured to decrypt the aggregate value.

4. The method according to claim 2, wherein the aggregate value is computed by further performing at least one of the following functions: computing the average of the encrypted concatenated second data items, computing the variance of the encrypted concatenated second data items, and computing the weighted sums of the encrypted concatenated second data items.

5. The method according to claim 2, further comprising the following steps between step c) and d):
    sending the aggregate value to a user of the electronic device, the electronic device or a second provider;
    decrypting the aggregate value; and
    encrypting the aggregate value with an encryption key being different from the first encryption key, and wherein step d) comprises the step of sending the re-encrypted aggregate value to the provider of the device.

6. The method according to claim 1, wherein the second encryption key is only configured to decrypt the aggregate value.

7. The method according to claim 6, wherein the aggregate value is computed by further performing at least one of the following functions: computing the average of the encrypted concatenated second data items, computing the variance of the encrypted concatenated second data items, and computing the weighted sums of the encrypted concatenated second data items.

8. The method according to claim 6, further comprising the following steps between step c) and d):
sending the aggregate value to a user of the electronic device, the electronic device or a second provider;
decrypting the aggregate value; and
encrypting the aggregate value with an encryption key being different from the first encryption key, and wherein step d) comprises the step of sending the re-encrypted aggregate value to the provider of the device.

9. The method according to claim 1, wherein the aggregate value is computed by further performing at least one of the following functions: computing the average of the encrypted concatenated second data items, computing the variance of the encrypted concatenated second data items, and computing the weighted sums of the encrypted concatenated second data items.

10. The method according to claim 1, further comprising the following steps between step c) and d):
sending the aggregate value to a user of the electronic device, the electronic device or a second provider;
decrypting the aggregate value; and
encrypting the aggregate value with an encryption key being different from the first encryption key, and wherein step d) comprises the step of sending the re-encrypted aggregate value to the provider of the device.

11. The method according to claim 1, wherein the second encryption key is based on a stateful encryption scheme.

12. The method according to claim 1, wherein the performance indicator is the averaged temperature of the device.

13. The method according to claim 1, wherein the first data item includes, is part, is at least one value of or comprises at least one value of a protection function for the integrity of the computation.

14. A system for aggregation of a performance indicator of a device comprising:
the device, wherein the device is configured to concatenate a respective first data item to a plurality of second data items and is configured to encrypt the plurality of concatenated second data items relevant for the computation of the performance indicator of the device using a first encryption key, wherein the first encryption key is based on an additive homomorphic encryption scheme,
a sending unit configured to send the encrypted concatenated second data items to a computation cluster;
the computation cluster being configured to compute the performance indicator of the at least one device using the encrypted concatenated second data items and configured to compute an aggregate value regarding the performance indicator by summing up the encrypted concatenated second data items; and
a sending unit configured to send the aggregate value to a server of the service provider of the device,
wherein the system further comprises the server of the service being configured to decrypt the aggregate value using a second encryption key, and
wherein the system further comprises a verification unit being configured to verify the decrypted result by checking whether the decrypted sum computed by summing up the encrypted concatenated second data items comprises a predetermined value.

15. The system according to claim 14, wherein the first data items is or comprises at least one number of at least one set of numbers $N \in \{1 \ldots m\}$ and the predefined value is $m(m+1)/2$.

16. The system according to claim 14, wherein the computation cluster is configured to compute aggregate values by further performing at least one of the following functions: computing the average of the encrypted concatenated second data items, computing the variance of the encrypted concatenated second data items, and computing the weighted sums of the encrypted concatenated second data items.

17. The system according to claim 14, wherein the sending unit is configured to send the aggregate value to a user of the electronic device, the electronic device or a second provider,
wherein the user of the electronic device, the electronic device or the second provider is configured to decrypt the aggregate value and is configured to encrypt the aggregate value with an encryption key being different from the first encryption key, and
wherein the sending unit is configured to send the re-encrypted aggregate value to the server of the service provider of the device.

18. The system according to claim 14, wherein the second encryption key is based on a stateful encryption scheme and wherein the server of the service provider is configured to decrypt the aggregate value using the second encryption key.

19. The system according to claim 14, wherein the first data item includes, is part, is at least one value of or comprises at least one value of a protection function for the integrity of the computation.

20. A non-transitory computer readable media for aggregation of a performance indicator of a device, the non-transitory computer readable media containing program code that when executed causes a computing system to perform the steps of:
concatenating a respective first data item to a plurality of second data items in the device;
encrypting the plurality of concatenated second data items relevant for computing the performance indicator using a first encryption key in the device, wherein the first encryption key is based on an additive homomorphic encryption scheme;
sending the encrypted concatenated second data items to a computation cluster;
computing the performance indicator on the computation cluster using the encrypted concatenated second data items and computing an aggregate value regarding the performance indicator by summing up the encrypted concatenated second data items;
sending the aggregate value to a server of a service provider of the device;
decrypting the aggregate value using a second encryption key on the server of the service provider; and
verifying the decrypted result by checking whether the decrypted sum computed by summing up the encrypted concatenated second data items comprises a predetermined value.

* * * * *